Aug. 21, 1934.　　　　H. A. VOGT　　　　1,970,677
LOCKING MEANS FOR WINDOW SCREENS AND THE LIKE
Filed May 20, 1933

INVENTOR
Henry A. Vogt,
BY
Fred O. Baker
ATTORNEY

Patented Aug. 21, 1934

1,970,677

UNITED STATES PATENT OFFICE 1,970,677

LOCKING MEANS FOR WINDOW SCREENS AND THE LIKE

Henry A. Vogt, Jamaica, N. Y., assignor of one-third to Henry A. Vogt, Jr., Woodhaven, N. Y., and one-third to Albert D. Vogt, Jamaica, N. Y.

Application May 20, 1933, Serial No. 671,945

8 Claims. (Cl. 156—38)

My present invention relates to extension or expansible window screens, ventilators, and analogous expansible and extension devices, and locking or anchoring devices therefor.

One object of the invention is to provide an efficient and simple clamp or locking means by which a frame or a pair of frames may be held firmly in any adjusted position, and in association with the sash, so that the sash when lowered to rest on the screen frames will be held securely by the clamping means so as to prevent rattling, vibration of the screen frame and also of the sash, as well as a protection against the screen falling out of place.

The invention further aims at the provision of a novel kind of locking means, especially for the sections of a screen of the extensible type, wherein the separate overlapping frames are peculiarly interlocked with the window sash, and held rigid and immovable, so that strong drafts of air will not dislodge these screens or ventilators, and any danger of the screens falling out of the window, or of persons—especially children—who happen to lean too strongly against the screen falling with the screen is effectually avoided.

With these and other general objects in view, the invention may be said to consist essentially in the features, combinations, details of construction and arrangement of parts, which will first be described in connection with the accompanying drawing and then more particularly pointed out, and finally claimed as novel in the subjoined clauses of claim.

In the annexed drawing:

Figure 1 is a front elevation of a partial conventional type of window frame and an extensible screen therein, on the top edge of which the window sash rests, the screen being interlocked with the sash and frame by means of my improved locking means whose parts are shown here in their active or engaged position.

Figure 2 is an isolated corner of the screen frame, showing my improved locking device applied thereto, the same appearing in full lines in the position it occupies when the upwardly-extending sash-engaging projection is in its operative position, and the same appearing in dotted lines in the position it takes in being reversed on its pivotal means from an active to an idle position so that its main body and its sash-engaging projection may lie closed on the upper edge of the screen frame.

Similar characters of reference designate corresponding parts in all the different figures of the drawing.

A conventional screen consists usually of two relatively slidable frames, as A and B, whose outer ends are adapted to be disposed in the opposite vertical window sash runways C, C, and to fill the space between the sill and the raised sash D, the screen frames of course being alike, as will be understood, and the window sash D being adapted to be brought down closely upon the upper edge of the screen frames after they have been adjusted to the width of the window.

Obviously moreover the invention may be applied with equal facility to non-extensible or single framed screens, ventilators, storm breaks, snow shields, and other articles.

In order to hold the screen stationary in position, and prevent it from being blown out of the window or accidentally pushed out, I provide locking means having the functions appertaining thereto as hereinabove specified. This locking means in a selective or preferred embodiment is shown in Figures 1 to 4, and in an alternative form in Figure 5.

Figure 3:
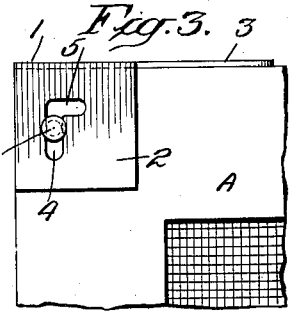
Figure 3 is a similar isolated corner view of the screen and locking means when the parts of the latter are in an inactive position.
Figure 4:
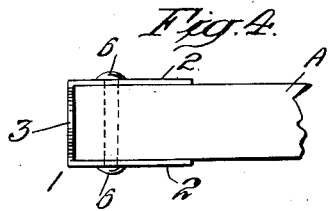
Figure 4 is a top plan view of the locking means as shown in Figure 2.

In the preferred form, or in one chief and effective practical specimen of the invention, the locking element includes in its entirety a main body of thin metal bent over in a substantially U-shape or rectangular form to embrace the end of the screen frame with a back 1 and two parallel plates 2, 2, which lie more or less closely against the sides of the end rail or part of screen frame A, for example, as shown in Figure 4; there being between the side plates 2, 2, at one end an integral back 1, the bends from the back 1 to sides 2 being rectangular, and back 1 is calculated to lie close against the plane edge of the end of the screen or against the plane top edge of the same in its different positions. And integral with the back plate 1 is a projecting extension 3 which lies in a straight line with the back 1 of the main body, and when the locking device is in active position the projection 3 (which may be tapered if desired) is in a vertical position as seen in Figure 2; and also when the locking device is closed down on the top edge of the screen the projection 3 will be inactive and out of the way as shown in Figure 3. When the device is in the service position of Figure 2 the vertical projection 3 will extend tightly into the thin space between the window frame C and the window sash D, see also Figure 1, where the window sash is closed tightly down upon the top of the screen frame A or B, the projections 3 of a locking device at each end of the screen being held tightly between the window sash and the window frame at each side, whereby the screen is anchored firmly in place.

Each of the parallel side plates 2 of the main body is provided with a right-angled slot, having a part 5 which is parallel to the back 1 in the clamp body and a part 4 at right angles to the part 5. The rail of the screen carries one or more stationary rivets, pivots, or pins 6, which project into these corresponding right-angled slots in the two plates 2, or there may be a single pin 6 as shown in Figure 4, these pins being preferably headed to keep the clamping means properly on the screen sections, and on these stationary pins 6, as on pivots, the locking devices are reversibly movable from service to inactive positions, as I have shown, the slots 4 and 5 permitting this movement and also having the function of locking the devices in either position when accurately adjusted.

Figure 1:
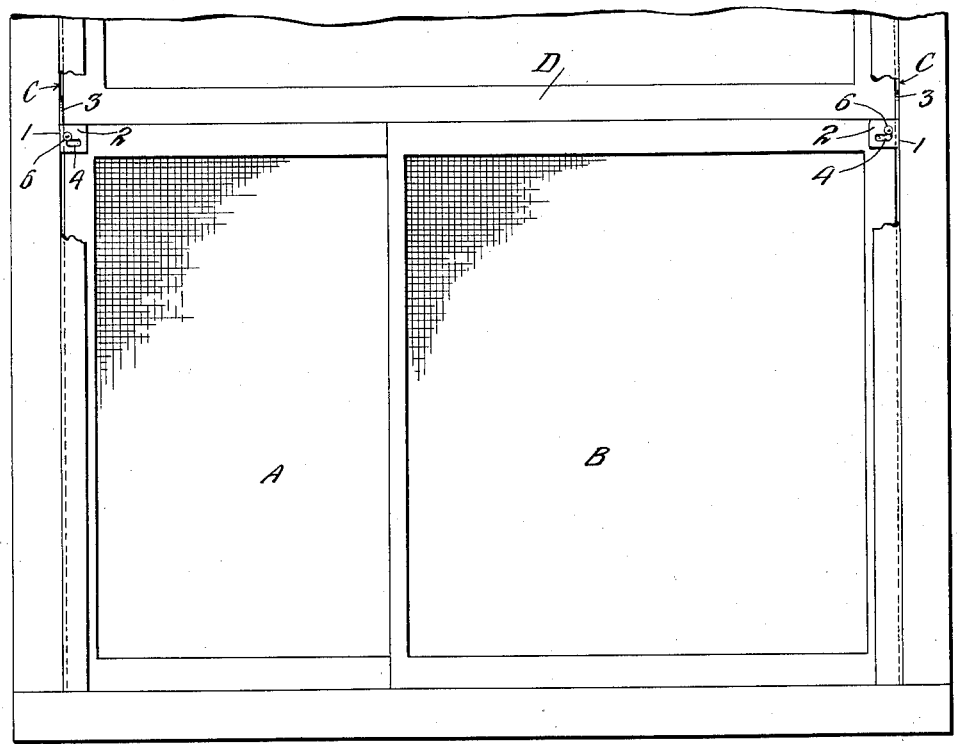
Figure 2:
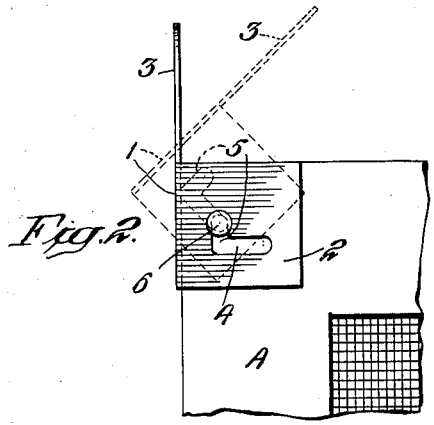

For when the locking device is in its service position as shown in Figure 2, the projection 3 extends upward vertically to engage between the sash and window frame, as in Figure 1, and the locking body having been pushed inwardly with its slots 4 in both plates 2 traveling on pivot 6 until the back 1 seats closely against the outer vertical square edge of the screen frame, and the pin 6 will then be at the apex of the right-angled slots; after which by a sliding movement downwardly of the back 1 on its seat the locking body will be shifted to permit the slots 5 in both plates 2 to travel on the pivot 6 until said pivot or pin lies in the upper ends of the slots 5, at which time the locking devices will be locked in an upright service position, as shown in Figures 1 and 2.

To change the locking devices into the idle or closed position, when the screens are to be readjusted or taken out of use, said locking devices will be lifted by laying hold of projection 3 from the position shown in Figures 1 and 2 until the pivots 6 are again at the apex of the right-angled slots. Then these locking devices may be moved horizontally so as to remove the back 1 from its close seat against the screen edge far enough to allow it to be revolved or reversed on pivot 6, as shown in dotted lines in Figure 2, until it reaches the new closed position in Figure 3. In this movement after the end of the slots 4 strike pivot 6 on which the locking devices are turning, and the devices have nearly reached the position of Figure 3, or are in a position where back 1 is only a short distance away from the top edge of the screen frame, the back 1 may be brought close against the edge of the screen, and this will cause the slots 4 to ride a short distance down on pivot 6, into the position shown in Figure 3, where the device is thus locked against displacement. It will be noted that the slots 4 and 5 will be of such lengths, and so localized with reference to the edges of the plates 2 and back 1 and pivot 6 as to insure the movements stated and the locking effects thereof in the several positions.

Figure 5:
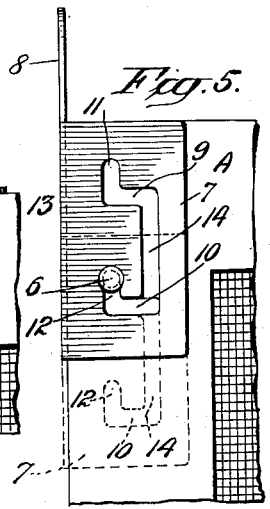
Figure 5 is a detailed view of a corner part of the screen with a modified form of locking means shown as applied thereto, the position of the locking means being shown in full lines when in working position and in dotted lines in its inactive or inert condition, the change being made by sliding the device and not turning it.

A modified form of the invention is displayed in Figure 5. This form is not reversible, but can be changed from service position to inactive position by sliding on the face of the screen frame so as to withdraw the sash-engaging projection from a position beyond the screen frame to a retracted position alongside of the screen outside of which it will not project. In this case the pivot or pin 6 does not serve as a pivot on which the body turns but merely as a locking pin or guide engaging with the slots to lock the device at different points.

In this specimen or embodiment of the invention the back 13 is longer than back 1 and the parallel side plates 7 are longer than sides 2, because they must contain longer slots, but the general character of the body that encloses the edge and top of the screen is the same in both instances, and back 13 has an aligned projection 8, serving a function like projection 3. Each of the two parallel side plates 7 is provided with a long slot 14 parallel to back 13, which slot communicates with a right-angled slot 9 at one end and a parallel right-angled slot 10 at the other end. The slot 9 has a short right-angled slot 11 at the end nearest back 13, and the slot 10 has a short right-angled slot 12 at the end nearest back 13, said slots 11 and 12 being in line with each other. There is also a pin or post 6 stationary in the screen frame and projecting through the slots in both plates 7, so that the plates may be moved about with the slots guiding them and the plates be locked by the pin 6.

The operation of the specimen of the invention shown in Figure 5 is readily seen. When the device is to be used it will be moved into the position shown in Figure 5 in full lines with the right-angled slots 12 having the pin 6 in the upper ends thereof, whereby the plates are held firmly locked with the back 13 against the end of the screen frame and the projection 8 extended into service position. Now if the device is to be put into disuse and made inactive the plates 7 will be lifted so that slots 12 will release the pin 6, when the plates 7 will thus be permitted to be moved to the left as far as slot 10 will allow, said slots riding on the pin 6, and this will loosen back 13 from the edge of the screen and permit the plates 7 to be drawn down into the lower position. Then by moving the plates 7 to the right while slots 9 move over the pin 6 the back 13 is reapplied close against the edge of the screen and the parts take the position shown by the lines dotted in Figure 5 and the projection 8 is now retracted below the top of the screen frame. The device can be locked in this inactive position by slightly dropping plates 7 and projection 8 and allowing slots 11 to engage pin 6 in the same way that slots 12 engage pin 6 in the other position of the body.

The use of either of the described forms of the invention will be quite evident without further detailed description. After an extensible screen has been properly adjusted to the width of a window, with the locking means at both ends arranged so that their projections extend upwardly in a vertical position, the window sash can be lowered until it rests on the screen frames, and then the sash will hold these projections closely against the inside of the window frame, as clearly shown in Figure 1. The screen in this way is firmly held but can be very quickly released at any time by lifting the sash and freezing the grip of the parts in the narrow space where they have been held. The use of the sliding form of the device in Figure 5 with the projection 8 is quite similar to that of the other form.

What I claim is:

1. In a device of the class described, the combination with a window screen, of locking means thereon having a projecting element adapted to be held between a window sash and window frame above the screen.

2. In a device of the class described, the combination with a window screen, of locking means carried thereon and having a projecting element adapted to be held between a sash and window frame above the screen, said locking means being adjustable between service and inactive positions.

3. In a locking means for window screens and the like, the combination with a screen, of a slotted device supported movably thereon and having a projection adapted to be held firmly between a sash and window frame, said slotted device having means whereby it may be locked in a service position at one time and in an idle position at another time.

4. In a device of the class described, the combination with a window screen, of locking means therefor, consisting essentially of a projection adapted to be held between a window sash and frame, and a body element integral with said projection and embracing the screen frame, and having a back and parallel sides at an angle to the back, said sides being slotted, and a stationary pin in the screen frame which projects loosely through said slots and permits the movement of the body so that the projection may occupy a service or an idle position.

5. In a device of the class described, the combination with a window screen, of locking means therefor consisting essentially of a projection adapted to be held between a sash and window frame, and a body member carrying the projection and embracing the screen frame, said body including a back and sides at an angle to said back, said sides having angular slots, and a stationary pin on the screen which projects through the slots.

6. In a device of the class described, the combination with a window screen, of locking means therefor, consisting essentially of a projecting element adapted to be held between a window sash and frame, and a body member carrying the projection and embracing the screen frame, said body including a back and sides at a right angle thereto, said sides having right-angled slots, one of whose parts is perpendicular to the back element and the other of whose parts is at a right angle to the first named part, and a stationary member on the screen frame which engages the slots.

7. In a device of the class described, the combination with an extensible screen, of locking means on an end thereof for anchoring the screen firmly in the window, said locking means including a projection adapted to be held between a window sash and window frame at a side of the window, and said locking means also including means for locking the said projection on the screen while in its projected position.

8. In a device of the class described, the combination with a window screen, of locking means therefor, including a body comprising a back, integral sides at a right angle thereto, a projecting element aligned and integral with the back, said sides embracing the sides of the screen and having right-angled slots therein, and a stationary element in the screen frame engaging the slots, all arranged so that the projecting element may be projected vertically above the screen and locked there, or may be closed down flat on the top edge of the screen and locked there.

HENRY A. VOGT.